United States Patent [19]

Yoshifuji

[11] 4,401,781

[45] Aug. 30, 1983

[54] LUBRICATIVE, OILY, CROSS-LINKED RESIN COMPOSITION

[75] Inventor: Junnosuke Yoshifuji, Takarazuka, Japan

[73] Assignee: Nippon Cable System Inc., Takarazuka, Japan

[21] Appl. No.: 414,825

[22] Filed: Sep. 3, 1982

Related U.S. Application Data

[63] Continuation of Ser. No. 251,061, Apr. 6, 1981, abandoned.

[51] Int. Cl.$^3$ ................................................. C08K 5/54
[52] U.S. Cl. .................................... 524/261; 524/310; 524/377; 524/388
[58] Field of Search ................ 524/388, 261, 310, 377

[56] References Cited

U.S. PATENT DOCUMENTS 3,795,646  3/1974  MacKenzie et al. ................ 524/264
4,041,002  8/1977  Aboshi et al. ....................... 524/377

Primary Examiner—Joseph L. Schofer
Assistant Examiner—N. Sarofin
Attorney, Agent, or Firm—Armstrong, Nikaido, Marmelstein & Kubovcik

[57] ABSTRACT

The present invention relates to a cross linked resin composition, which comprises an oil being contained in cross linked polyethylene, and therefore can provide various sliding parts, which are excellent in wear-resistance heat-resistance and lubricity, such as liner of inner cable in control cable, high speed bearing or bearing sleeve.

16 Claims, No Drawings

4,401,781

LUBRICATIVE, OILY, CROSS-LINKED RESIN COMPOSITION

This is a continuation, of application Ser. No. 251,061, filed Apr. 6, 1981, now abandoned.

BACKGROUND OF THE INVENTION

The present invention relates to a novel lubricative, oily, cross-linked resin composition, more particularly to an oily, cross-linked resin composition having an excellent heat-resistance, wear-resistance and lubricity.

It is well known that in order to endow the lubricity and wear-resistance to a frictinal sliding surface in a bearing or a control cable, various sleeves of synthetic resins are provided on the sliding surface of the bearing, or liners or covering layers of synthetic resins similar to the sleeves are provided on the sliding surface of the control cable. For example, the control cable such as pull-cable, push-cable or rotatatory cable, which is employed to operate brake, clutch, accelerator, speedometer or the like, consists essentially of a flexible conduit and an inner cable which is a single wire, or which is formed by stranding several wires. Such a control cable can remotely control a working device connected to the one end of the inner cable by push-pull or rotation of the other end of the inner cable. In that case, it is necessary to minimize friction and wear caused between the conduit and the inner cable as much as possible in order to smoothly carry out the above-mentioned operations of the inner cable in the control cable.

As a conventional method, there are methods that the liner of the synthetic resin is interposed between the conduit and the inner cable, that the covering layer of the synthetic resin is provided on the inner cable as mentioned above, and further that a lubricating oil is filled between the conduit and the inner cable. However, these methods are unsatisfied in the lubricity and the wear-resistance of the inner cable, and then cannot endure in a long period of use.

In order to overcome these drawbacks, it is recently suggested that the lubricating oil such us silicone oil is permeated into a polyethylene powder or pellet which gives the liner or covering layer by an extruder. However, in such a method, the lubricating oil is slightly contained in an amount of 5% by weight against the polyethylene powder or pellet, whereby the liner or covering layer obtained still has problems in the lubricity and the wear-resistance. Furthermore, because polyethylene, for example, high density polyethylene, can be used only within low temperature range (less than about 80° C.), the liner or covering layer obtained is inferior at mechanical property in high temperature.

Also, polytetrafluoroethylene and polyacetal are frequently employed as a liner or covering layer material. These are high expensive, and further are unsatisfied in the lubricity and the wear-resistance. That is to say, polytetrafluoroethylene is inferior in the wear-resistance, and polyacetal is inferior in the lubricity.

OBJECT OF THE INVENTION

A main object of the invention is to provide a lubricative, oily, cross-linked resin composition which is excellent in the heat-resistance, wear-resistance and lubricity.

A further object is to provide a cross-linked resin composition having economical advantages.

These or other objects will be apparent from the following description.

DETAILED DESCRIPTION OF THE INVENTION

It has now been found that the above-mentioned objects can be attained by the oily, cross-linked resin composition which comprises a cross-linked polyethylene and an oil contained in the cross linked polyethylene in an amount of 1 to 300 parts by weight per 100 parts by weight of cross linked polyethylene.

In the present invention, the oil, especially lubricating oil is contained in the cross-linked polyethylene during or after cross-linking of polyethylene to thereby significantly improve the heat-resistance, wear-resistance and lubricity of the obtained liner, covering layer or bearing sleeve. Thus, the composition of the invention can be preferably employed for molding of, for example, main body and sleeve of the high speed bearing, liner and covering layer in the control cable, main body and sleeve of rail or roller, main body of resinous gear, engagement portions of the gear or the like.

In the above rail, roller or gear, there are further advantages that noise is prevented by improvements in the lubricity and the wear-resistance of these sliding surface or engagement portions of teeth.

Though low or high density polyethylene is suitably employed as polyethylene in the invention, high density polyethylene (density: 0.900 to 0.958, average molecular weight: 150,000 to 200,000) is more preferably employed in view of heat-resistance and mechanical property.

As a method for cross linking, there are, for example, (1) a cross linking method that electron rays are directly radiated to polyethylene after molding, (2) a chemical cross linking method that polyethylene containing a cross linking agent accepts heat treatment in the presence of water or oil after molding, and (3) a heat cross linking method that polyethylene is bridged by the cross linking agent at the same time as molding. In the invention, all the above methods for cross linking can be employed. For example, in employing electron rays, after electron rays of 20 to 25 MV are radiated to polyethylene for 1 to 3 minutes, polyethylene is heated in the oil at 120° to 280° C. for 2 to 3 minutes to contain a certain amount of the oil. In employing the cross linking agent, after polyethylene containing the conventional cross linking agent is bridged either in the presence of steam at 80° to 120° C. for 1 to 2 hours after molding or at the same time as molding, polyethylene is heated in the oil in the similar manner to that mentioned above to contain the oil. Further, after molding polyethylene containing the cross linking agent, polyethylene is heated in the oil at 140° to 180° C. for 2 to 60 minutes to carry out cross linking and to simultaneously contain the oil.

In these methods, the method for carrying out the cross linking reaction and simultaneously containing the oil is most preferably employed in view of economical and productive advantages.

Examples of the oil employed in the invention are glycol lubricating oil such as polyoxyalkylene glycolmonoether, vegetable oil such as castor oil having hydroxy groups in the molecule, silicone oil or grease. The glycol lubricating oil is preferably employed in order to carry out cross linking reaction in the oil.

Oil content against cross linked polyethylene is determined by a suitable adjustment of temperature and time for heating the oil, and is directly proportional to temperature and time for heating the oil. Thus, temperature and time for heating the oil can be suitably determined, and is not limited into the above ranges. In the invention, temperature and time for heating the oil are selected as occasion demands in order to obtain the desirable oil content against cross linked polyethylene, and therefore the oil is contained in an amount of 1 to 300 parts by weight, and preferably 3 to 50 parts by weight per 100 parts by weight of cross linked polyethylene.

In the invention, degree of cross linking in polyethylene is preferably adjusted so that a rate of gelation (a rate of unsoluble ingredient in organic solvent to which the cross linked polymer is added) is in a range of 50 to 80% by weight, but is not limited to this range.

Thus, the composition of the invention has advantages that the heat-resistance and the mechanical strength are improved by cross linked polyethylene, and can endure sufficiently even under about 200° C. Furthermore, in the invention, the wear-resistance and the lubricity are significantly improved in comparison with alone of polyethylene or other lubricative resin such as polytetrafluoroethylene or polyacetal, since the oil is contained in the cross linked polyethylene.

As a result, the composition of the invention is preferably employed for molding of various sliding parts such as bearing body, bearing sleeve, liner or covering layer in the control cable, rail or roller body, sleeve of the rail or roller, resinous gear body or teeth engagement portion of the gear. These sliding parts can be smoothly functioned, have an excellent durability in a long period of use, and further can sufficiently endure to heat produced by friction in high speed movement as in high speed bearing.

The invention is more specifically described and explained by the following Examples.

EXAMPLE 1

High density polyethylene (commercially available under Sholex 6002 made by SHOWA DENKO K. K., a density of 0.955, an average molecular weight of 200,000) containing a silane cross linking agent was extruded at 220° C. to obtain a liner for a control cable, having 3.0 mm. in inner diameter, 3.6 mm. in outer diameter and 800 mm. in length. The liner was soaked in polyoxyalkylene glycolmonoether as an oil, and was heated at 160° C. for 3 minutes. As a result, a rate of gelation was 60% by weight, and the oil was contained in an amount of 15 parts by weight per 100 parts by weight of cross linked polyethylene.

The liner thus obtained was inserted between a conduit having 8 mm. in inner diameter and 800 mm. in length and an inner cable consisting of double stranded steel wires and having 2 mm. in outer diameter and 1200 mm. in length to obtain the control cable, of which a functional efficiency was measured.

For measuring functional efficiency, the control cable was bent to hemi-circular shape having a radius of 200 mm., and a certain weight was attached to one end of the inner cable. After repeating the tension-laxation, i.e. push-pull operation, of 50 cycles in a stroke length of 35 mm. at a room temperature, a load cell was attached to the other end of the inner cable, and power required to pull the inner cable against load was measured by the load cell. Functional efficiency was calculated by the following equation.

Functional efficiency (%) = $W/F \times 100$

F: Power measured by the load cell (kg.)

W: Weight (kg.)

In weights of 10 kg. and 30 kg., each functional efficiency was measured. The result is shown in Table 1.

EXAMPLE 2

A control cable was obtained in a similar manner to Example 1 except that after molding, the liner was soaked in polyoxyalkylene glycolmonoether, and that was heated at 160° C. for 20 minutes. As a result, a rate of gel was 60% by weight, and the oil was contained in an amount of 45 parts by weight per 100 parts by weight of cross linked polyethylene.

Functional efficiency was measured in a similar manner to Example 1. The result is shown in Table 1.

Further, as Comparative Sample, high density polyethylene (non cross linked) employed in Example 1, acetal copolymer (commercially available under DURACON M-25-01 made by Polyplastics Co., Ltd.), polytetrafluoroethylene (commercially available under TEFLON made by E. I. du Pont de Nemours & Co. Inc.) and cross linked polyethylene (not containing the oil) were employed to prepare each liner. Each functional efficiency of the control cables obtained is measured in similar manner to Example 1. The result is also shown in Table 1.

Further, functional efficiency of each Sample was measured in two kinds of the control cable which was filled or not filed with grease between the inner cable and the liner.

TABLE 1

| Functional efficiency in each resinous material (%) | | | | |
|---|---|---|---|---|
| Weight (kg.) | 10 | | 30 | |
| Grease | filled | not filled | filled | not filled |
| Ex. 1 (Oil content of 15% by weight) | 90.7 | 90.0 | 89.6 | 89.5 |
| Ex. 2 (Oil content of 45% by weight) | 92.0 | 92.0 | 90.0 | 90.0 |
| High density polyethylene | 85.5 | 82.0 | 82.2 | 80.3 |
| Acetal copolymer | 80.3 | 75.0 | 78.5 | 73.0 |
| Polytetrafluoroethylene | 83.3 | 80.0 | 80.0 | 75.0 |
| Cross linked polyethylene (containing oil) | 85.7 | 82.5 | 82.5 | 81.0 |

EXAMPLE 3

After molding a sample plate having a diameter of 50 mm. and a thickness of 2 mm. by employing the same high density polyethylene containing a cross linking agent as in Example 1, the sample plate was soaked in polyoxyalkylene glycolmonoether, and was heated at 160° C. for 3 minutes. As a result, the rate of gelation was 60% by weight, and the oil was contained in an amount of 15 parts by weight per 100 parts by weight of cross linked polyethylene.

The friction and wear properties of this sample were determined by a high speed friction and wear tester (commercially available under type EFM-III-EU-738 made by TOYO BALDWIN Co., Ltd).

In the test, the sample plate was put on a foundation, and further a metal ring having 30 mm. in outer diameter and 20 mm. in inner diameter was put on a center portion of the sample plate. The metal ring was rotated at a linear velocity of 300 mm./min. in a room temperature under a weight of 100 kg. carried on the metal ring. Thus, coefficient of friction and wearing time were determined.

Coefficient of friction was calculated by the following equation $$\mu = W/F$$

$\mu$: Coefficient of friction
W: Weight (kg.)
f: Load (kg.)

Also, wearing time was determined by a time till the weight (100 kg.) carried on the metal ring reached to reduction of 5% by weight (95 kg.).

These results are shown in Tab. 2.

EXAMPLE 4

A sample plate was obtained in a similar manner to Example 3 except that after molding, the sample plate was soaked in polyalkylene glycolmonoether, and that was heated at 160° C. for 20 minutes. As a result, the rate of gelation was 60% by weight, and the oil was contained in an amount of 45 parts by weight per 100 parts by weight of cross linked polyethylene.

Coefficient of friction and wearing time were measured in a similar manner to Example 3. These results are shown in Table 2.

Further, high density polyethylene, acetal copolymer, polytetrafluoroethylene and cross linked polyethylene (not containing the oil) were respectively employed to prepare each smple plate as Comparative Sample.

These results are also shown in Table 2.

TABLE 2

| Coefficient of friction and wearing time in each resinous material | | |
|---|---|---|
|  | Coefficient of friction | Wearing time (min.) |
| Ex. 3 (Oil content of 15% by weight) | 0.082 | 60< |
| Ex. 4 (Oil content of 45% by weight) | 0.075 | 60< |
| High density polyethylene | 0.136 | 2.5 |
| Acetal copolymer | 0.245 | 1.3 |
| Polytetrafluoroethylene | 0.095 | 28 |
| Cross linked polyethylene (not containing oil) | 0.130 | 2.8 |

EXAMPLE 5

A Sample plate which was prepared in a similar manner to Example 3 was put on the foundation in the above friction and wear tester. After putting a metal ring having 30 mm. in outer diameter and 20 mm. in inner diameter on a center portion of the sample plate, both the sample plate and the metal ring were rotated at a liner velocity of 300 mm./min. for 60 minutes in each high-temperature condition of 100° C., 120° C., 150° C. and 200° C. The result is shown in Table 3.

TABLE 3

| Heat-resistance in each resinous material | | | | |
|---|---|---|---|---|
|  | Temperature (°C.) | | | |
|  | 100 | 120 | 150 | 200 |
| Ex. 3 (Oil content of 15% by weight) | normal | normal | normal | normal |

TABLE 3-continued

| Heat-resistance in each resinous material | | | | |
|---|---|---|---|---|
|  | Temperature (°C.) | | | |
|  | 100 | 120 | 150 | 200 |
| High density polyethylene | normal | —(A) | — | — |
| Acetal copolymer | normal | normal | —(A) | — |

(A)Softened after 2.8 minutes, and showing significant increases in friction and wear.

From these Examples, it is apparent that the composition of the invention is preferably applied to a sliding part, which is excellent in wear-resistance and lubricity, such as liner or covering layer of inner cable in control cable, high speed bearing or bearing sleeve.

What is claimed is:

1. A lubricative, oily, cross-linked resin composition suitable for use as a frictional sliding layer or element, which comprises 100 parts by weight of a cross-linked polyethylene, and 1 to 300 parts by weight of a glycol lubricating oil impregnated in the cross-linked polyethylene.

2. The composition of claim 1, wherein the cross-linked polyethylene is one cross-linked in the presence of a cross-linking agent.

3. The composition of claim 1, wherein the oil is contained in an amount of 3 to 50 parts by weight per 100 parts by weight of the cross-linked polyethylene.

4. The composition of claim 1, wherein the polyethylene is a high density polyethylene.

5. The composition of claim 1, wherein the degree of cross-linking of the polyethylene is adjusted to that gelation is in a range of 50 to 80% by weight.

6. A lubricative, oily, cross-linked resin composition suitable for use as a frictional sliding layer or element, which is produced by heating a cross-linked polyethylene is a glycol lubricating oil.

7. The composition of claim 6, wherein the composition comprises 100 parts by weight of the cross-linked polyethylene and 1 to 300 parts by weight of the oil impregnated in the cross-linked polyethylene.

8. The composition of claim 7, wherein the oil is contained in an amount of 3 to 50 parts by weight per 100 parts by weight of the cross-linked polyethylene.

9. The composition of claim 6, wherein the polyethylene is a high density polyethylene.

10. The composition of claim 6, wherein the degree of cross-linking of the polyethylene is adjusted to that gelation is in a range of 50 to 80% by weight.

11. The composition of claim 6, wherein the cross-linked polyethylene is heated in the oil at 120° to 180° C. for 2 to 3 minutes.

12. A lubricative, oily, cross-linked resin composition suitable for use as a frictional sliding layer or element, which is produced by cross-linking a polyethylene in a glycol lubricating oil.

13. The composition of claim 12, wherein the composition comprises 100 parts by weight of the cross-linked polyethylene and 1 to 300 parts by weight of the oil impregnated in the cross-linked polyethylene.

14. The composition of claim 12, wherein the polyethylene is a high density polyethylene.

15. The composition of claim 12, wherein the degree of cross-linking of the polyethylene is adjusted so that gelation is in a range of 50 to 80% by weight.

16. The composition of claim 12, wherein after molding, the polyethylene is heated in the oil at 140° to 180° C. for 2 to 60 minutes to simultaneously carry out cross-linking and providing oil for said composition.

* * * * *